(12) United States Patent
Hiraoka (10) Patent No.: US 8,487,994 B2
(45) Date of Patent: Jul. 16, 2013

(54) APPARATUS AND METHOD FOR DETERMINING THE CENTER OF ANNUAL RINGS OF A WOOD BLOCK

(75) Inventor: Noriyuki Hiraoka, Aichi (JP)

(73) Assignee: Meinan Machinery Works, Inc., Obu-shi (JP)

( * ) Notice: Subject to any disclaimer, the term of this patent is extended or adjusted under 35 U.S.C. 154(b) by 511 days.

(21) Appl. No.: 12/923,515

(22) Filed: Sep. 24, 2010

(65) Prior Publication Data
US 2011/0074949 A1    Mar. 31, 2011

(30) Foreign Application Priority Data

Sep. 28, 2009    (JP) ................................. 2009-222950

(51) Int. Cl.
| | |
|---|---|
| *H04N 7/18* | (2006.01) |
| *G06K 9/00* | (2006.01) |
| *G01B 11/022* | (2006.01) |
| *G01B 11/024* | (2006.01) |

(52) U.S. Cl.
USPC ........... 348/135; 382/140; 382/190; 382/203; 382/287; 356/10; 356/13; 356/138

(58) Field of Classification Search
USPC .................. 348/135; 382/141, 190, 197, 199, 382/203, 288
See application file for complete search history.

(56) References Cited

U.S. PATENT DOCUMENTS

| | | | |
|---|---|---|---|
| 7,900,663 B2 * | 3/2011 | Huang ........................... 144/356 |
| 2008/0140248 A1 * | 6/2008 | Moore ........................... 700/223 |

* cited by examiner

*Primary Examiner* — Sath V Perungavoor
*Assistant Examiner* — Howard D Brown, Jr.
(74) *Attorney, Agent, or Firm* — Edwards Wildman Palmer LLP (57) ABSTRACT

An apparatus and a method for determining the annual ring center of a wood block are disclosed. A plurality of lines of path is figured out and generated. Each line of path is composed of a plurality of lines each extending normal to a line that is tangential to an annual ring in an image of the wood block end. The normal line may be figured out, for example, by calculating the variance of values of pixels lying on each of a plurality of straight lines of a filter and the sum of the variances for the plurality of straight lines at a plurality of different angular positions of the filter. The annual ring center in the image of the wood block end is determined through calculation based on the points of intersection of the generated lines of path.

20 Claims, 10 Drawing Sheets

APPARATUS AND METHOD FOR DETERMINING THE CENTER OF ANNUAL RINGS OF A WOOD BLOCK

BACKGROUND OF THE INVENTION

The present invention relates to an apparatus and a method for determining the center of annual rings of a wood block. More specifically, the invention relates to an apparatus and a method for determining or specifying the annual ring center in an image of an end of a wood block.

In manufacturing laminated wood products such as plywood and laminated veneer lumber (LVL), wood veneer is used which is produced by cutting or peeling a generally cylindrical wood block by a veneer knife. The veneer knife is fed into the wood block rotating on its spin axis from the peripheral surface toward that spin axis of the wood block. Such cutting is done by a machine called a rotary veneer lathe.

Figure 8:
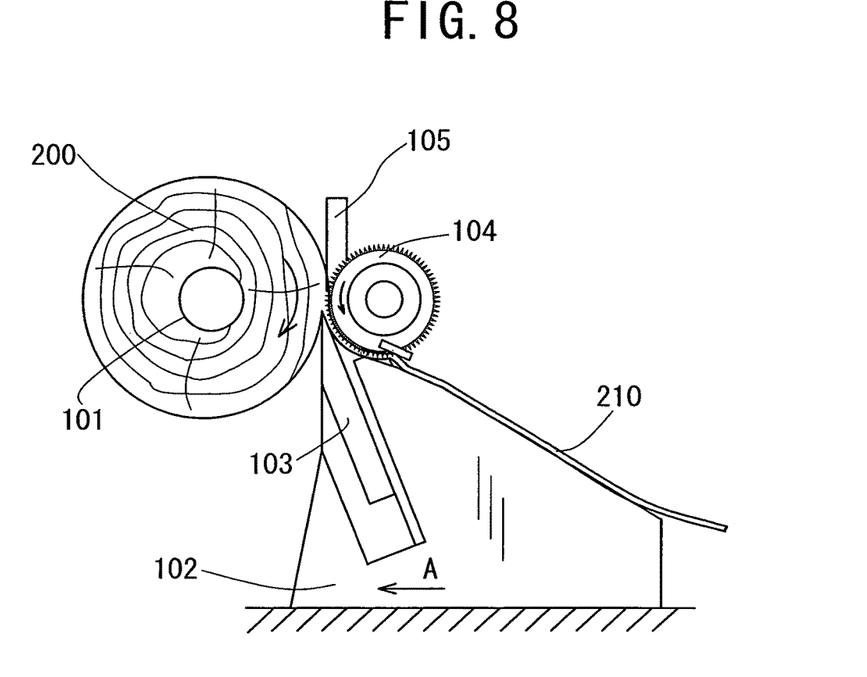
FIG. 8 is a schematic side view showing a typical rotary veneer lathe.

FIG. 8 is a schematic diagram showing a typical rotary veneer lathe. The rotary veneer lathe includes a pair of spindles 101 (only one spindle being shown in the drawing) each having at the inner end thereof a chuck for supporting a wood block 200 at the opposite ends thereof so as to rotatably holds the wood block 200. The rotary veneer lathe further includes a knife carriage 102 having a veneer peeling knife and movable toward the spindles 101 the spin axis of the wood block 200, as indicated by arrow A, for a predetermined distance for each turn of the block 200. The feed rate of the knife carriage 102, or the distance moved by the knife carriage 102 for each turn of the block 200, is controlled by an electrical signal generated in accordance with the rotation of the spindles 101.

The veneer peeling knife 103 is fixedly mounted on the knife carriage 102 at a position adjacent to the top of the knife carriage 102 for movement therewith. Reference numeral 104 designates a plurality of discs each having at the outer periphery thereof a number of tooth-like projections and driven to rotate in arrow direction B. These discs 104 are juxtaposed at a predetermined spaced interval in the direction that is perpendicular to the direction A in which the knife carriage 102 is moved. A nose bar 105 is provided between any two adjacent discs 104 for pressing the outer periphery of the wood block 200 at a position immediately above the cutting edge of the veneer peeling knife 103.

In such a rotary veneer lathe, the wood block 200 is supported at the opposite ends thereof by the spindles 101 and driven to rotate in arrow direction C by pressingly engaging the discs 104 rotating in arrow direction B at the piercing projections thereof with the outer periphery of the wood block 200. Moving the knife carriage 102 toward the spin axis of the wood block 200 at a controlled feed rate in arrow direction A, a sheet of veneer 210 having a predetermined thickness is peeled by the knife 103 from the wood block 200.

The wood block 200 that is prepared by cross-cutting a natural log to the desired length does not have a truly cylindrical shape. In order to produce veneer 210 from such wood block 200 with as high yield as possible, it has been general practiced to hold by the spindles 101 the wood block 200 at an optimum spins axis that corresponds to the center of gravity such as 202 (FIG. 9) of the block ends. Holding a wood block at such center of gravity as the spin axis for the peeling operation, however, problems occur in peeling particularly softwoods or coniferous woods, such as sugi (Japanese cedar).

Figure 9:
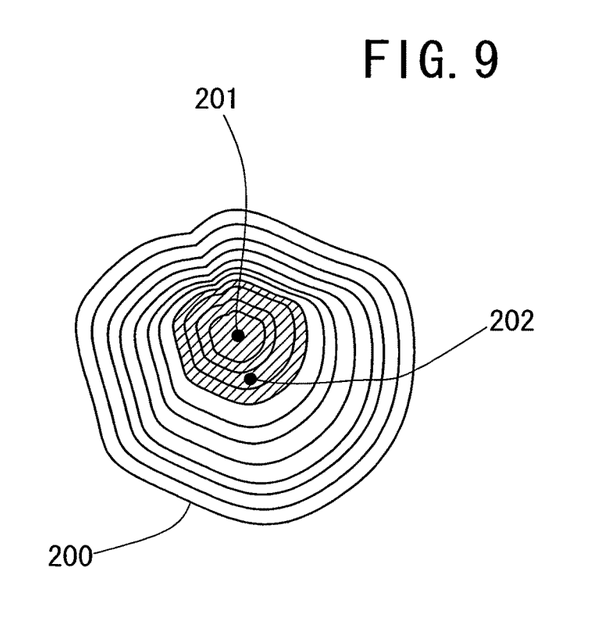
FIG. 9 is a schematic view showing an end of a wood block and a pattern of annual rings on the end.

Referring to FIG. 9 showing an end of a wood block 200 of a softwood and a pattern of annual rings, the wood block 200 has at the core thereof juvenile wood extending radially outward from the center pith 201 of the wood block for an extent corresponding to about 15 years of tree age, as indicated by shaded area in FIG. 9. The juvenile wood has characteristics that are different from those of the radially outer mature wood of the same wood block 200. For example, as compared to the mature wood, the juvenile wood shrinks and swells to a larger extend with a change of moisture content and is lower in strength than the mature wood of the same wood block.

If such softwood block 200 is rotated about the center of gravity 202 as the spin axis by a rotary lathe as shown in FIG. 8 for veneer production, veneer containing no juvenile wood is produced from the outer mature wood, while veneer containing both juvenile wood and mature wood (such veneer being referred to as mixed veneer) is produced from wood adjacent to and around the center of gravity 202. In the aforementioned LVL having a plurality of veneer sheets laminated together with the grain thereof oriented generally in the same direction, if a sheet of mixed veneer is present in either of the opposite outermost layers of LVL, the resulting lumber tend to be easily broken when it is subjected to tension or compression by bending. The problem may be avoided by using the mixed veneer sheet in layers of LVL other the outermost layers.

Peeling veneer by rotating the wood block 200 about its center of gravity 202 produces a relatively large volume of mixed veneer. In order to avoid the use of mixed veneer in the outermost layers of LVL for solving the above problem, laborious sorting of mixed veneer from normal veneer containing no juvenile wood may have to be performed. In view of the relatively large amount of mixed veneer produced, a situation may occur where mixed veneer cannot help but be used in the outermost layers of LVL. Thus, the problem remains unsolved.

Figure 10A:
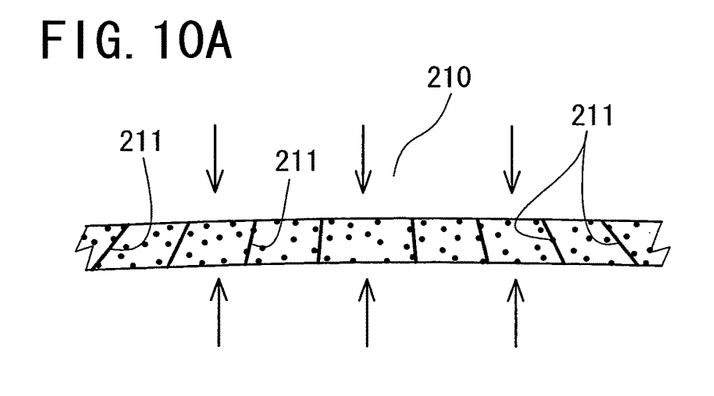
FIGS. 10A and 10B are schematic views showing respective orientations of ray tissue in veneer sheets as viewed in the cross-section thereof.

On the other hand, peeling veneer from a hardwood by rotating the wood block about its center of gravity, such as 202, creates a problem that is different from the above problem associated with softwood. Generally, wood has rays or ray tissue (not shown in FIG. 9) extending radially outward that is important for regulating the radial strength of the wood. Ray tissue is hard particularly in hardwood. FIG. 10A shows in cross-section a veneer sheet peeled from, a block of hardwood rotated about the center of gravity. The ray tissue 211 is indicated by oblique line in FIG. 10A. As shown in FIG. 10A, most of the radial ray tissue 211 in the veneer sheet 210 extend obliquely with respect to the opposite surfaces of the veneer sheet 210.

If a plurality of veneer sheets such as 210 laid one on another for manufacturing LVL is pressed by a pair of heat plates and receives over the entire opposite surfaces thereof pressing forces as indicated by opposing arrows in FIG. 10A, the oblique ray tissue 211 is further inclines with respect to the veneer sheet surfaces, with the result that the veneer sheets are excessively deformed plastically in the thickness direction. The LVL made of such deformed veneer sheets is deficient in the desired thickness and, therefore, will be rejected as defective.

In order to solve the above problems encountered in peeling veneer from wood block, Kokoku (Japanese Examined Patent Publication) No. S62-45803 discloses a method of peeling veneer. The Publication proposes that a wood block, whose pith such as 202 corresponding to the annual ring center fails to coincide with the center of gravity such as 201 in FIG. 9, should be rotated about the latter annual ring center in peeling veneer from the block. By so peeling veneer from a softwood, the resulting veneer consists of veneer peeled from juvenile wood and veneer peeled from the rest of the wood block. Using the sheets of former veneer in inner layers and using the sheets of latter veneer in outer layers of LVL, the problem with the strength against bending can be solved successfully.

Figure 10B:
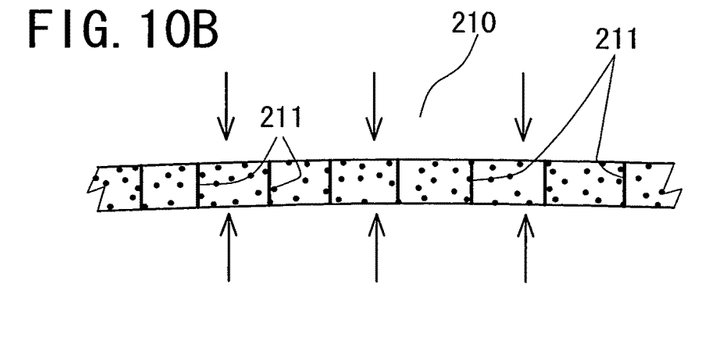

In the case of peeling veneer from hardwood by using the method according to the above Publication, ray tissue, such as 211 in FIG. 10B, in the resulting veneer extend substantially perpendicularly with respect to the opposite surfaces of the veneer sheet, as shown in FIG. 10B. Thus, veneer sheet is less prone to plastic deformation due to the pressing force because the hard ray tissue serves to support the radial strength of wood. Therefore, LVL made of such veneer sheets is prevented from having a defect due to the lack of thickness.

According to the method proposed by the above Publication, however, a workman needs to observe the ends of each wood block carefully to locate the position of the pith or the annual ring center with the naked eyes each time a wood block is to be mounted on a rotary veneer lathe for determining the spin axis of the block for veneer peeling operation. This requires the workman to do a lot of troublesome and hence inefficient work, including observing the block end, locating the annual ring center, setting spindles to the located annual ring center for chucking the wood block.

An object of the present invention, which has been made in light of the above-described problems, is to provide a method and an apparatus for automatically determining the annual ring center of a wood block, thereby improving the working efficiency in veneer peeling operation by a rotary veneer lathe.

SUMMARY OF THE INVENTION

According to the present invention, a line of path composed of a plurality of lines each extending normal to a line that is tangential to an annual rings present in an image of a wood block end is figured out and generated. The annual ring center in the wood block end image is specified or determined based on the points of intersection of a plurality of such lines of path each directing generally toward the annual ring center in the wood block end image. As will be appreciated from the detailed description of embodiments of the invention, the normal line to the tangential line with respect to an annual ring in the wood block end image can be figured out in various ways.

An apparatus in accordance with an aspect of the present invention includes a device such as camera for photographing an end of a wood block and generating a bitmapped image composed of pixels representing the wood block end, a device for setting a plurality of points from which seeking for the respective lines of path starts and a filter having a plurality of parallel spaced straight lines and rotatable about the center thereof to a plurality of different angular positions.

The apparatus further includes a device for setting the filter in the image of the wood block end. The device is also operable to calculate a value representing a degree of spread-out of distribution of differences of pixel values of at least selected pixels lying on each of the straight lines of the filter from mean of the pixel values at each of the angular positions of the filter. The device calculates also a sum of the values each representing the degree of spread-out of distribution for the plurality of straight lines of the filter at each of the angular positions of the filter. Comparing the calculated sums, the device determines a line that is normal to the straight lines of the filter at an angular position thereof where the sum is the least as the normal line with respect to a line that is tangential to the annual ring, thereby generating such normal line. The filter is moved for a predetermined distance along the generated normal line radially inwardly of the wood block end image.

Repeating the generation of a normal line and movement of the filter for each of the seek starting points, a plurality of lines starting from the respective seek starting points are generated. The apparatus has a device for specifying the center of annual rings in the wood block end image based on the points of intersections of such lines of path.

The present invention also provides a method of determining the annual ring center of a wood block using the above apparatus.

Features and advantages of the present invention will become more apparent to those skilled in the art from the following description of preferred embodiments of the present invention, which description is made with reference to the accompanying drawings.

DETAILED DESCRIPTION OF THE EMBODIMENTS

The following will describe the embodiments of method and apparatus for determining the center of annular rings of a wood block according to the present invention with reference to the accompanying drawings. As will be apparent from the description, the annual ring of a wood block is determined by specifying the annual ring center in a bitmapped image of an end of the wood block.

Figure 1:
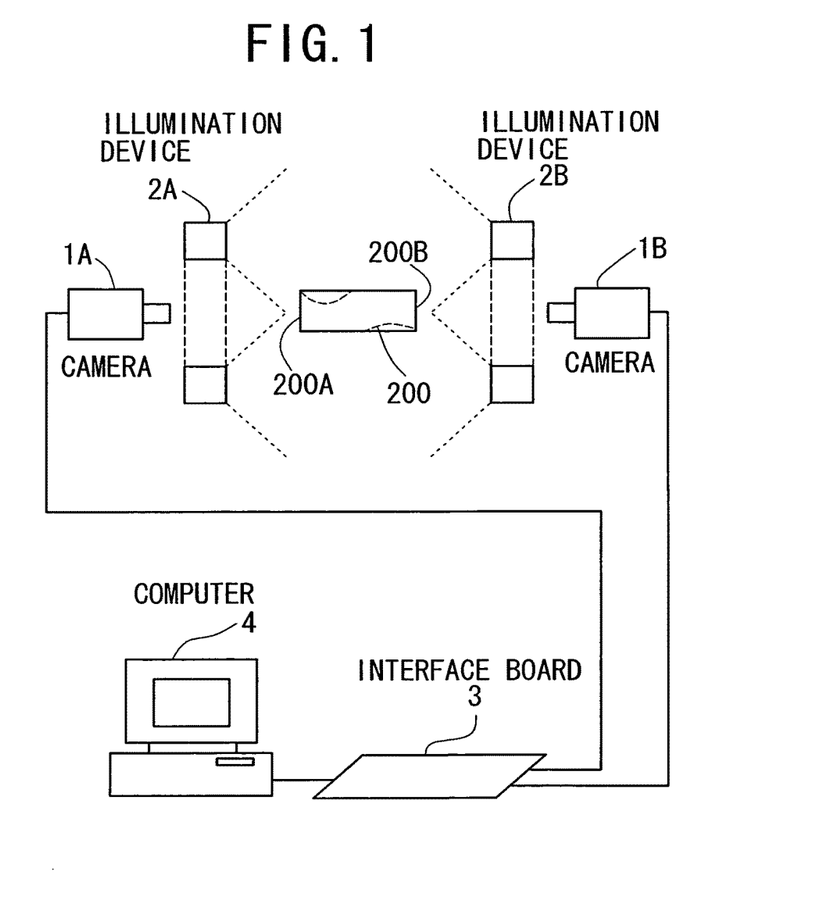
FIG. 1 is a configuration diagram showing an embodiment of an apparatus for determining the center of annular rings of a wood block according to the present invention.

Referring to FIG. 1 showing the configuration diagram of the apparatus according the embodiment of the present invention, the apparatus includes a pair of cameras 1A, 1B, a pair illumination devices 2A, 2B, an interface board 3 and a computer 4. The cameras 1A, 1B are disposed at positions adjacent to the opposite ends 200A, 200B of a wood block 200 for photographing the ends 200A, 200B, respectively, and generating a bitmapped image of the photographed wood block end. The cameras 1A, 1B are connected to the computer 4 through the interface board 3 so that the data of images photographed by the cameras 1A, 1B is sent to and stored in an image data memory 20 (FIG. 2) that is provided in the computer 4.

As indicated in FIG. 1, the illumination devices 2A, 2B are annular shaped and disposed adjacently to the opposite ends 200A, 200B of the wood block 200 for illuminating the block ends 200A, 200B. A flash device such as an electronic flash may be uses for the illumination devices 2A, 2B. The illumination devices 2A, 2B should preferably be disposed as close as possible to the block ends 200A, 200B, respectively, so that the light from the illumination devices 2A, 2B illuminates the block ends 200A, 200B with brightness that is enough for the cameras 1A, 1B to take clear images of the block ends 200A, 200B.

Image photographed and generated by each camera 1A, 1B is a bitmapped image composed of pixels each having a pixel value. The image covers not only the image of a wood block end, but also the background image. Photographing with high brightness, the block ends 200A, 200B can be photographed light and clear while the background is taken relatively dark. Though the illumination devices 2A, 2B are not necessarily essential in the present invention, the use of the illumination devices 2A, 2B makes it easier for the computer 4 to perform image processing of the photographed block end image, as will be appreciated from the description to be made hereinafter.

Figure 2:
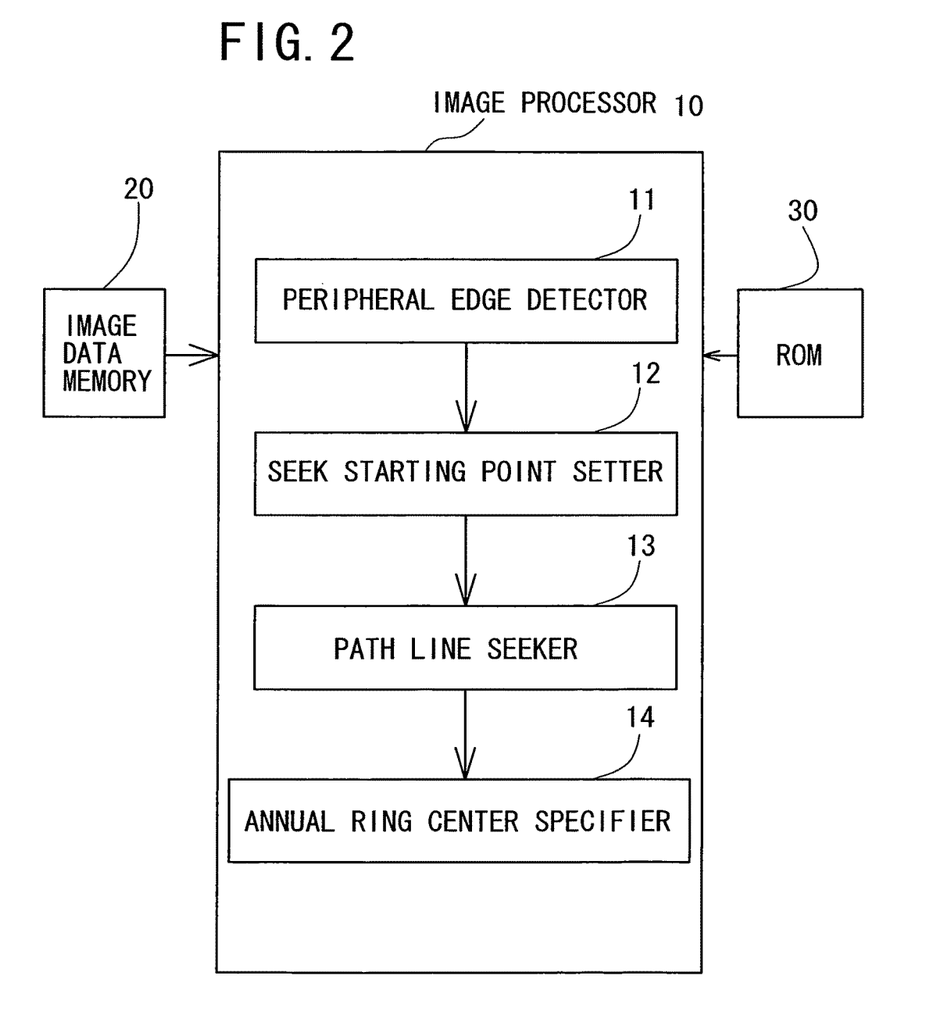
FIG. 2 is a configuration diagram showing components and various functions of a computer used in the apparatus of FIG. 1.

Referring to FIG. 2, the computer 4 has incorporated therein an image processor 10, the aforementioned image data memory 20 and a ROM 30. The image data memory 20 stores therein data of images photographed by the cameras 1A, 1B and taken into the computer 4 through the interface board 3. The image processor 10 is operable to process an image stored in the image data memory 20 in accordance with a program for determining an annual ring center of a wood block end stored in the ROM 30. Obviously, the annual ring center determining program may be stored in any other suitable storage media other than ROM 30, such as RAM, CD-ROM, hard disk, optical disk, magnetic optical disk, DVD, semiconductor memory, etc.

As shown in FIG. 2, the image processor 10 has various functions including a peripheral edge detector 11, a seek starting point setter 12, a path line seeker 13 and an annual ring center specifier 14. Though the names of some functions may not be clear for immediate understanding of their functions, they will be appreciated from the following description. The peripheral edge detector 11 is operable to detect the outer peripheral edge of the block end image photographed and generated by the camera 1A, 1B and stored in the image data memory 20. The detection of the outer peripheral edge may be accomplished by using any known method as exemplified below.

Firstly, the peripheral edge detector 11 clips an image covering the area of the wood block end from the overall image photographed by the camera 1A, 1B. The term "clip" as used herein means distinguishing the area of the wood block end from the other area of the photographed image including the background. Because the wood block ends 200A, 200B are illuminated with sufficient brightness by the illumination devices 2A, 2B, the block end appears light while the background relatively dark in the photographed image, which makes it easy to distinguish the wood block end image from the background image. Additionally, in view of that each cut end of the wood block 200 has its own characteristic color, the image clipping may be accomplished with an increased accuracy by adding colors as the criterion for distinguishing the wood block end image from the background image. The peripheral edge detector 11 then detects or specifies the outer peripheral edge of the block end image and stores the data of the detected peripheral edge in any image data memory in terms of pixel coordinates.

The seek starting point setter 12 is operable to set a plurality of points 41 (FIGS. 3 and 4) on the detected outer peripheral edge of the wood block end image. As will be described in detail in later part hereof, seeking for the annual ring center on the wood block end image by using a filter 42 (FIG. 4) begins from these points 41 on the peripheral edge of the block end image. To be more specific, the seeking for the annual ring center is accomplished by seeking a line of path along which the filter 42 has been moved, as will be described hereinafter. Such points will be referred to as "seek starting points." Any number of seek starting points 41 may be set by the seek starting point setter 12 depending on the desired accuracy in determining the annual ring center. At least three starting points such as 41 should be set, but as many starting points as the number of pixels present on the outer peripheral edge image may be set at maximum. The number of the seek starting points 41 corresponds to the number of seeking operations performed by the aforementioned path line seeker 13 using the filter 42. Accuracy of determining the annual ring center of the block end image is increased with an increase in the number of seeking operations. However, an increased number of seeking operations inevitably increases the processing load on the image processor 10. Therefore, an appropriate number of the seek starting points should be set depending on the desired accuracy and other conditions in determining the annual ring center.

Figure 3:
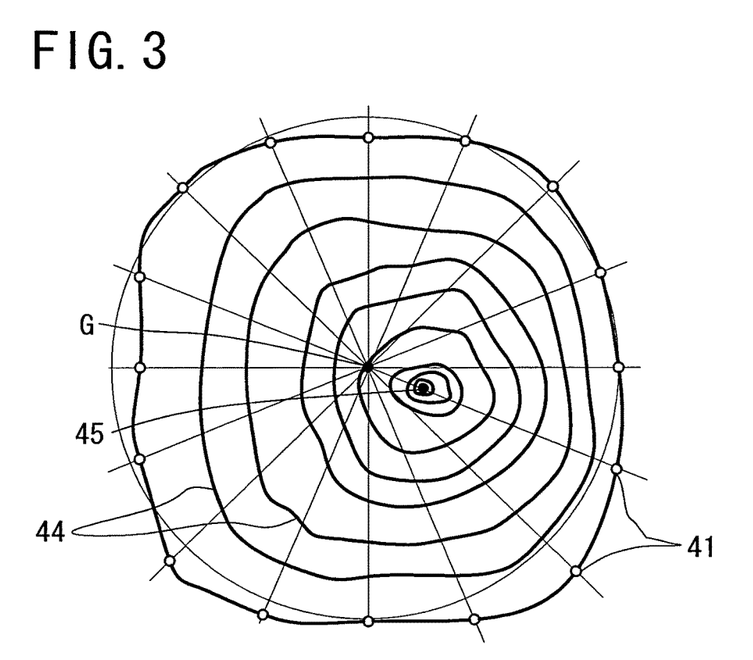
FIG. 3 is a schematic view showing an image of an end of a wood block and a plurality of seek starting points that are set by a seek starting point setter in the computer of FIG. 2.

In the present illustrated embodiment, the seek starting point setter 12 sets as many as sixteen seek starting points 41, as shown in FIG. 3. The sixteen seek starting points 41 may be set at any arbitrary points on the outer peripheral edge of the wood block end image. In the present embodiment, the sixteen seek starting points 41 are set at the points of intersection between the outer peripheral edge of the wood block end image and sixteen different lines that are substantially equiangularly spaced and extending radially outward from the gravity center G in the wood block end image. Incidentally, the gravity center G may be calculated from the coordinates of pixels lying on the outer peripheral edge of the wood block end image. Alternatively, the seek starting points 41 may be set at sixteen points that are equidistantly spaced on the outer peripheral edge. In FIG. 3, reference numeral 45 designates the center of annual rings that is to be sought and specified by using a procedure of steps of image processing operation.

The aforementioned path line seeker 13 of the image processor 10 is operable firstly to set the filter 42 (FIG. 4) on the wood block end image and then to figure out the directions that is normal to a line tangential to an annual ring appearing in the filter 42 thereby to seek and generate a line that is normal to the tangential line. Then, the filter 42 is moved radially inwardly for a predetermined distance along the generated normal line. The path line seeker 13 figures out again the direction that is normal to a line tangential to an annual ring then present in the filter 42, thereby generating a normal line with respect to the tangential line. Such generation of a normal line and the subsequent movement of the filter 42 along the generated normal line are repeated, so that the path line seeker 13 generates a broken line of path along which the filter 42 has moved from each of the plural seek starting points 41. For increasing the accuracy in determining the direction of normal line with respect to a line tangential to an annual ring, it is preferable that the image in RGB format, if stored in this format in the image data memory 20, should be converted into grayscale image prior to the operation by the path line seeker 13.

Figure 4:
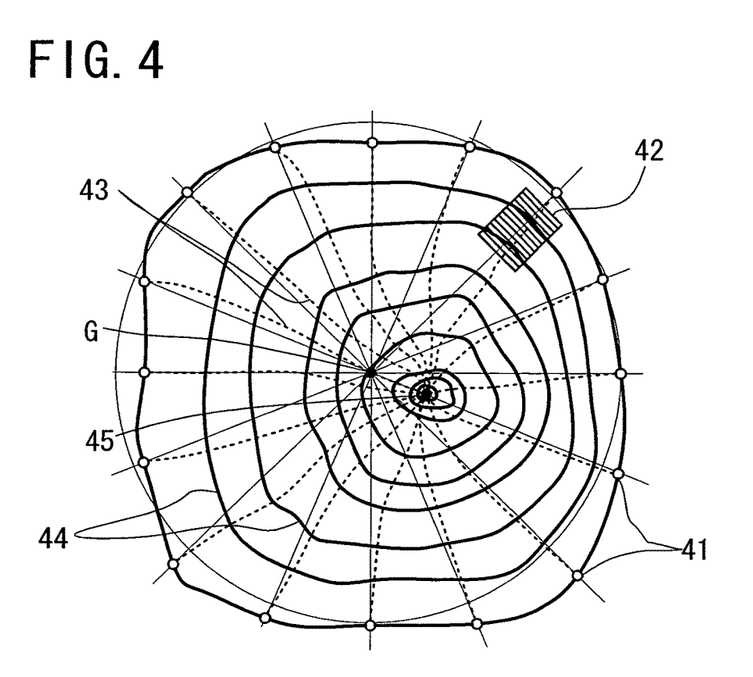
FIG. 4 is a schematic view illustrating the operation of seeking a line of path of a filter on the wood block end image.

Referring to FIG. 4 schematically illustrating the operation of the path line seeker 13, reference numeral 43 designates the broken lines of path (indicated by dotted lines) along which the filter 42 has moved from the respective seek starting points 41 and numeral 44 designates annual rings appearing on the wood block end image. As will be appreciated from the description in later part hereof, the broken line of path is composed of a plurality of normal lines sought and generated by the path line seeker 13.

An annual ring on a wood block end may refer to one year's growth that is produced each year and usually composed of two growth layers, i.e. a broad, large-celled layer and a narrow, denser layer. It is noted, however, that in the present description the annual ring appearing in the wood block end image refers to the latter narrow, denser layer of the annual growth ring, unless otherwise specified, for the sake of clarity of the description. In FIGS. 3 and 4, such annual rings are shown by a plurality of generally concentric rings.

Referring to FIGS. 3 and 4, each annual ring 44 on the wood block end image is formed by an annular image composed similar high-density pixels. In other words, the annual ring 44 is formed by connecting pixels having similar high densities. As will be appreciated from FIG. 4, when a line is drawn that is normal to a line tangential to an annual ring 44 at any point on the ring 44, the line normal to the tangential line is directed generally toward the annual ring center 45.

Taking any one pixel on the annual ring 44 as the reference pixel, those pixels which are present adjacent to the one reference pixel along the annual ring 44 have only a little difference in pixel value from the reference pixel. On the other hand, those pixels which are present adjacent to the one reference pixel but along the above normal line have relatively large difference in pixel value from the reference pixel.

Figure 5:
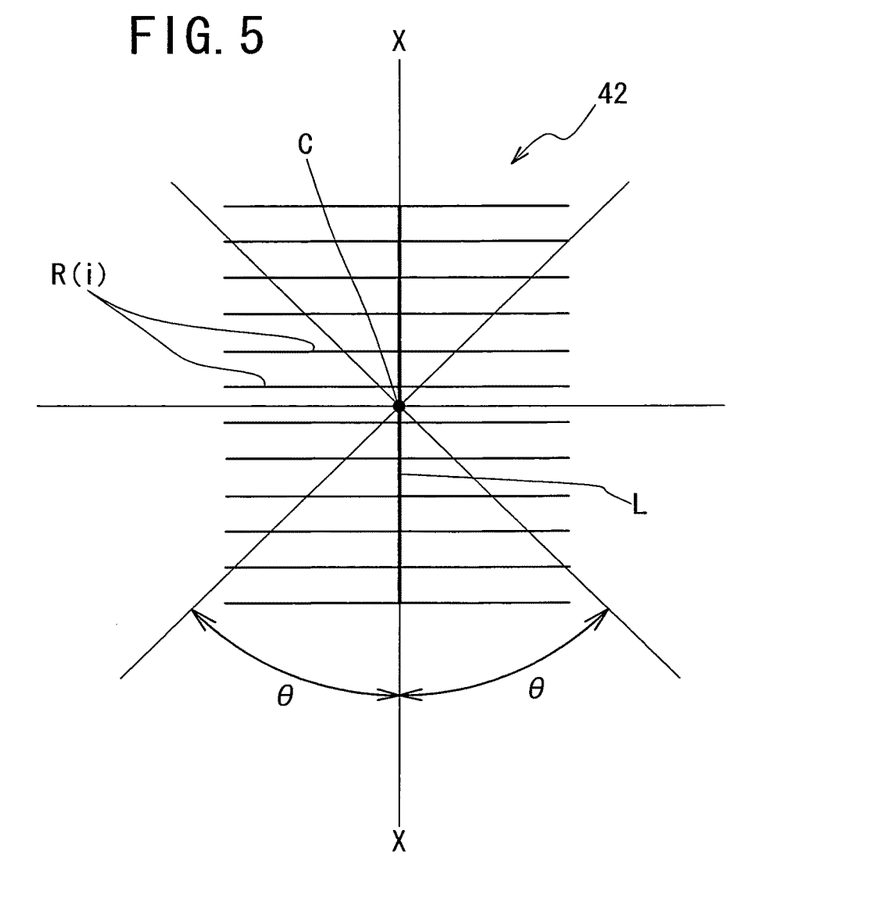
FIG. 5 is a schematic view showing an example of the filter used in the seeking operation.

The filter 42 shown in FIG. 4 and having a predetermined size is used in determining the direction of a normal line to a tangential line with respect to an annual ring 44 by making use of above-described manner of distribution of values of pixels around an annual ring 44 in the wood block end image. As shown in FIG. 5, the filter 42 has a plurality of parallel straight lines R(i) having a predetermined length and spaced apart from each other at an interval that is shorter than the spacing between any two adjacent annual rings 44 (or the width of an annual ring representing one-year growth layer). In FIG. 5, reference symbol L designates the length of the filter 42 that is larger than the spacing between any two adjacent annual rings 44 and by far smaller than the general radius of the wood block end image. The spaced interval of the plural straight lines R(i) may be of a size corresponding to a distance of, for example, one pixel or a couple of pixels of the image. The center of the filter 42 is indicated by C. As will be described later with reference to FIG. 5, the filter 42 is rotatable about its center C to a plurality of difference angular positions. It is also noted that the filter 42 is actually not a physical device incorporated in the image processor 10, but it is a device in an image processing program.

The path line seeker 13 sets the filter 42 in the wood block end image with the center C of the filter 42 located on a pixel of the block end image. Initially, the filter 42 is set with its center C located on a pixel on any one of the seek starting points 41.

With the filter 42 thus set at any first seek starting point 41, the path line seeker 13 figures out the degree of dispersion of value of pixels lying on each straight line R(i) of the filter 42. The degree of dispersion in this case represents to what degree the distribution of values of pixels lying on each straight line R(i) is spread out. In other words, it is the degree of spread-out of distribution of differences of pixel values of the pixels lying on each of the straight lines R(i) of the filter from mean of the pixel values. The path line seeker 13 may calculate the variance σ(i) of pixel values that is an example of the degree of dispersion. Alternatively, the difference between the maximum pixel value and the minimum pixel value of the pixels on each straight line R(i) may be figured out as the degree of dispersion. In the present embodiment, the variance σ(i) of pixel values is calculated as the degree of dispersion, and the description will be made accordingly.

It is to be noted that "pixels lying on a straight line R(i) of the filter 42" as used herein do not necessarily mean all pixels lying on the straight line R(i), but denote any selected number of pixels lying on the straight line R(i).

The path line seeker 13 then calculates the sum Σσ(i) of variances σ(i) calculated for the respective straight lines R(i) of the filter 42. Alternatively, a mean value Σσ(i)/i of variances σ(i) may be calculated instead of the sum Σσ(i). In the present embodiment, the sum Σσ(i) of variances σ(i) is calculated, and the description will be made accordingly.

When the difference between the maximum and minimum pixel values of the pixels on each straight line R(i) is figured out as the degree of dispersion, the path line seeker 13 calculates the sum of the differences calculated for the respective straight lines R(i) of the filter 42.

The path line seeker 13 calculates the sum Σσ(i) of variances σ(i) in a manner as described in the following.

The path line seeker 13 set the filter 42 such that its center C is located on a pixel on any one of the seek starting points 41 and also that an imaginary line X-X extending perpendicularly to the straight lines R(i) is directed generally toward the center of gravity G of the wood block end image, as shown in FIG. 5. Then, the path line seeker 13 causes the filter 42 to rotate about its center C from the position of FIG. 5 for an angle θ in opposite directions form the imaginary line X-X, respectively, as indicated by double-headed arrows in FIG. 5. The above sum Σσ(i) of variances σ(i) of pixel values is calculated at a plurality of different angular positions of the filter 42. For example, when the angle θ is 45° and the path line seeker 13 calculates the sum Σσ(i) of variances σ(i) for each degree (or 1°), the sum Σσ(i) of variances σ(i) is calculated at a total of 91 different angular positions of the filter 42.

Figure 6A:
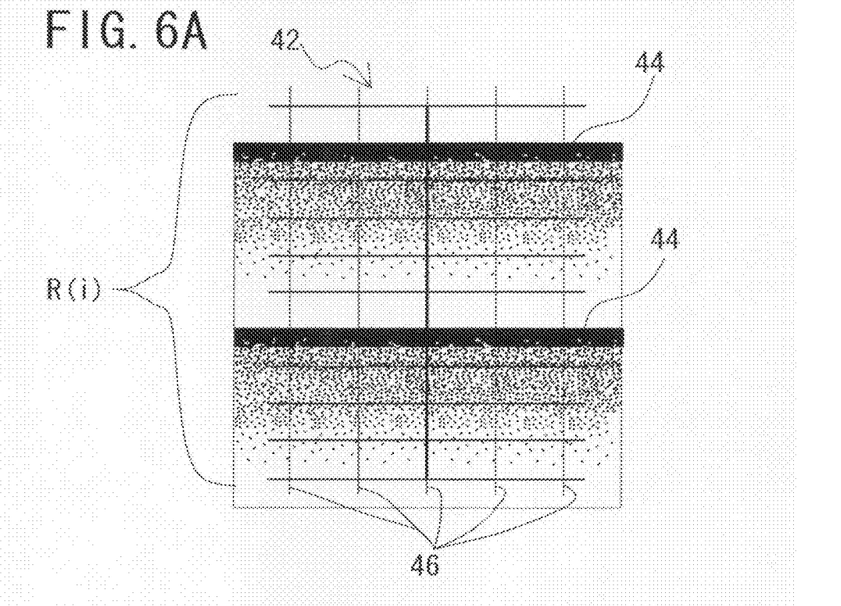
FIGS. 6A and 6B are schematic views showing two different relations between the filter of FIG. 5 and annual rings on the wood block end image.
Figure 6B:
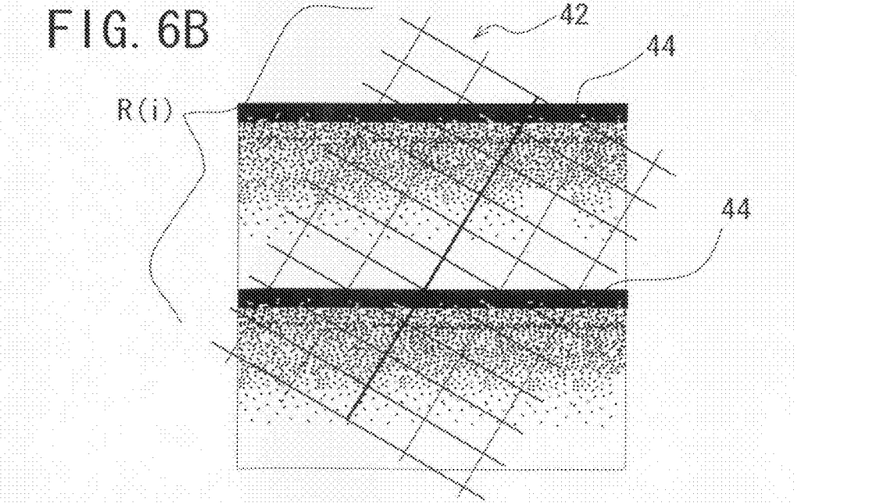

Reference is now made to FIGS. 6A and 6B showing two different states between the straight lines R(i) of the filter 42 and the annual rings 44. A segment of an annual ring in the wood block end image with a length corresponding to the straight line R(i) of the filter as shown in FIGS. 6A and 6B is extremely short and hence approximate to a straight line. Therefore, the annual rings 44 shown in the drawings of FIGS. 6A and 6B may be taken as substantial equivalent to lines tangential to such annual rings, and the description of FIGS. 6A and 6B will be made accordingly.

FIG. 6A shows a state where the directions of the straight lines R(i) of the filter 42 and of the annual rings 44 in the filter 42 generally coincide with each other, while FIG. 6B shows a state where the filter 42 is rotated about its center C for a angle from the position of FIG. 6A, so that the direction of the straight lines R(i) is oblique with respect to the direction of the annual rings 44.

As shown in FIGS. 6A and 6B, the annual ring 44 is indicated by a narrow layer having a high density. The grayscale between any two adjacent annual rings 44 varies in such a way that the density of the grayscale becomes gradually weaker radially inwardly and becomes strong again at the next radially inner annual ring 44. Such high-density layer appears as the image of an annual ring 44 in the wood block end image.

The sum $\Sigma\sigma(i)$ of variances $\sigma(i)$ calculated by the path line seeker 13 becomes the least when the filter 42 is placed at an angular position where the straight lines R(i) and the annual rings 44 are closest to being parallel to each other, as shown in FIG. 6A. It is because the variance $\sigma(i)$ of values of pixels lying on a straight line R(i) becomes less as the straight line R(i) is placed closer to being parallel to the annual ring 44.

On the other hand, when the filter 42 is placed relative to the annual rings 44 in such a way that the straight lines R(i) are angularly shifted, as shown in FIG. 6B, from the position of FIG. 6A, the sum $\Sigma\sigma(i)$ of variances $\sigma(i)$ is increased with an increase of the angular shifting of the straight lines R(i) of the filter 42. It is because the pixels lying on each of the straight lines R(i) have a wider spread out of distribution of pixel values, thereby increasing the variances $\sigma(i)$ for the respective straight lines R(i).

The path line seeker 13 compares the sums $\Sigma\sigma(i)$ calculated at the respective different angular positions of the filter 42 and takes a line that is normal to the straight lines R(i) at an angular position of the filter 42 where the sum $\Sigma\sigma(i)$ is the least as the normal line with respect to the annual ring 44. Accordingly, the path line seeker 13 generates a normal line with respect to the annual ring 44 then present in the filter 42. Such normal line is indicated by dotted line in FIG. 4.

After generating the first normal line extending from the seek starting point 41, the path line seeker 13 sets the filter 42 to the next seek point by shifting the filter 42 with its center C moved toward the center of gravity G along the generated normal line for a distance corresponding to a predetermined number of pixels and generates the next normal line to the annual ring 44 then present in the filter 42 using the same steps of procedure as described above.

Repeating such operations, a line of path 43 along which the filter 42 has move from the seek starting point 41 is generated. Specifically, the line of path 43 is formed by a broken line connecting a plurality of points at which the center C of the filter 42 was set by the path line seeker 13. The broken line includes a plurality of normal lines generated by the path line seeker 13 with respect to the annual rings 44 in the wood block end image.

Further repeating the above steps of operation for each of the remaining seek starting points 41, as many as sixteen lines of path 43 are formed as indicated by dotted lines in FIG. 4. Data of such lines of path 43 of the filter 42 is stored in the memory in the form of pixel coordinates.

The total distance that the filter 42 moves from each of the seek starting points 41 for generating a line of path 43 should be at least longer than the radius of the wood block end image centered on the center of gravity G. The annual ring center 45 on a wood block end image does not necessarily coincide with the center of gravity G, but the distance from the seek starting point 41 to the annual ring center 45 to be determined may be longer than the radius of the wood block end image depending on the seek starting point 41 from which the filter 42 begins to move. For this reason, the total distance that the filter 42 moves from each of the seek starting points 4 for generating a line of path 43 should preferably be about 1.5 times as long as the radius of the wood block end image.

The aforementioned annual ring center specifier 14 is operable to specify or determine the position of the annual ring center 45 based on the data of plural lines of path 43 generated by the path line seeker 13. As indicated earlier, each line of path 43 consisting of a plurality of broken lines extending in normal relation to the respective annual rings 44 is directed generally toward the annual ring center 45 of the wood block end image so as to pass through the annual ring center 45 or a point that is close thereto. When the lines of path 43 intersect with each other at a single point, the annual ring center specifier 14 takes that point as the annual ring center 45. When the lines of path 43 fail to intersect at a single point, but intersect at a plurality of different points, the center of gravity of such intersecting points is calculated and the calculated point is determines as the annual ring center 45.

Method of finding out a normal line with respect to an annual ring by the path line seeker 13 is not limited to the above-described method, but it may be done in various embodiments as exemplified below.

For example, the path line seeker 13 may firstly calculate a sum $\Sigma(i)$ of values of pixels lying on each of the straight line R(i) of the filter 42. Alternatively, the path line seeker 13 may calculate a mean value $\Sigma(i)/j$ (j representing the number of pixels present on the straight line R(i)) of the pixel values instead of the sum $\Sigma(i)$. In the embodiment to be described now, the path line seeker 13 calculates the sum $\Sigma(i)$ of pixel values, and the description will be made accordingly.

After calculating the sums $\Sigma(i)$ of pixel values for the respective straight lines R(i), the path line seeker 13 then figures out the degree of dispersion of the sums $\Sigma(i)$. The degree of dispersion in this case represents to what degree the distribution of the sums $\Sigma(i)$ is spread out, i.e. the differences of the respective sums $\Sigma(i)$ from means such sums $\Sigma(i)$. In the present embodiment, the path line seeker 13 calculates the variance $\sigma(i)$ of the sums $\Sigma(i)$ that is an example of the degree of dispersion. Alternatively, the degree of dispersion may be calculated in terms of the difference between the maximum and the minimum of the sums $\Sigma(i)$ calculated for the respective straight lines R(i). In the present embodiment, the path line seeker 13 calculates the variance $\sigma\Sigma(i)$ of the sums $\Sigma(i)$, and the description will be made accordingly.

When a mean value $\Sigma(i)/j$ is calculated instead of the sum $\Sigma(i)$, the path line seeker 13 figures out the degree of dispersion of the mean values $\Sigma(i)/j$, i.e. the degree of dispersion representing to what degree the distribution of the mean values $\Sigma(i)/j$ is spread out. In this case, the path line seeker 13 calculates the variance $\sigma(i)$ of the mean values $\Sigma(i)/j$ that is an example of the degree of dispersion. Alternatively, the degree of dispersion may be calculated in terms of the difference between the maximum and the minimum of the mean values $\Sigma(i)/j$ calculated for the respective straight lines R(i).

In the present embodiment, the path line seeker 13 calculates the variances $\sigma\Sigma(i)$ of the sums $\Sigma(i)$ for the respective different angular positions of the filter 42. The variance $\sigma\Sigma(i)$ of the sums $\Sigma(i)$ becomes the greatest when the filter 42 is set with its straight lines R(i) extending closest to being parallel to the annual rings 44 in the filter 42. That is, referring to the state of FIG. 6A where the straight line R(i) are closest to being parallel to the annual rings 44, the sum $\Sigma(i)$ of values of pixels lying on the annual rings 44, i.e. the highest-density image on the wood block end image is substantially the smallest, while the sum $\Sigma(i)$ of values of pixels lying other than the annual rings 44 is larger. It is noted that the higher the image density is, the lower the pixel value of the image is.

When the filter 42 is rotated so that its straight lines R(i) are angularly shifted from the position of FIG. 6A to the position of FIG. 6B, the variance $\sigma\Sigma(i)$ of the sums $\Sigma(i)$ is decreased. In the position of the filter 42 shown in FIG. 6B, each straight line R(i) has thereon pixels of various values from the smallest to the largest values because the straight line R(i) extends through pixels having a wider spread out of distribution of pixel values. In the case of FIG. 6A, therefore, the difference among the sums $\Sigma(i)$ of pixel values for the respective straight lines R(i) is less and hence the variance $\sigma\Sigma(i)$ of the sums $\Sigma(i)$ is decreased.

The path line seeker 13 compares the variances σΣ(i) of the sums Σ(i) calculated at the respective different angular positions of the filter 42 and determines a line that is normal to the straight lines R(i) of the filter 42 at an angular position thereof where the variance Σσ(i) of the sums Σ(i) is the least as the normal line with respect to the annual ring 44.

Alternatively, it may be so arranged that the path line seeker 13 calculates both of the sums Σσ(i) of variances σ(i) and the variances σΣ(i) of the sums Σ(i) at the respective different angular positions of the filter 42 and then calculates the value of J(θ), i.e. σΣ(i)/Σσ(i). Comparing the values J(θ), the path line seeker 13 determines a line that is normal to the straight lines R(i) of the filter 42 at an angular position thereof where the value J(θ) is largest as the normal line with respect to the annual ring 44.

Figure 7:
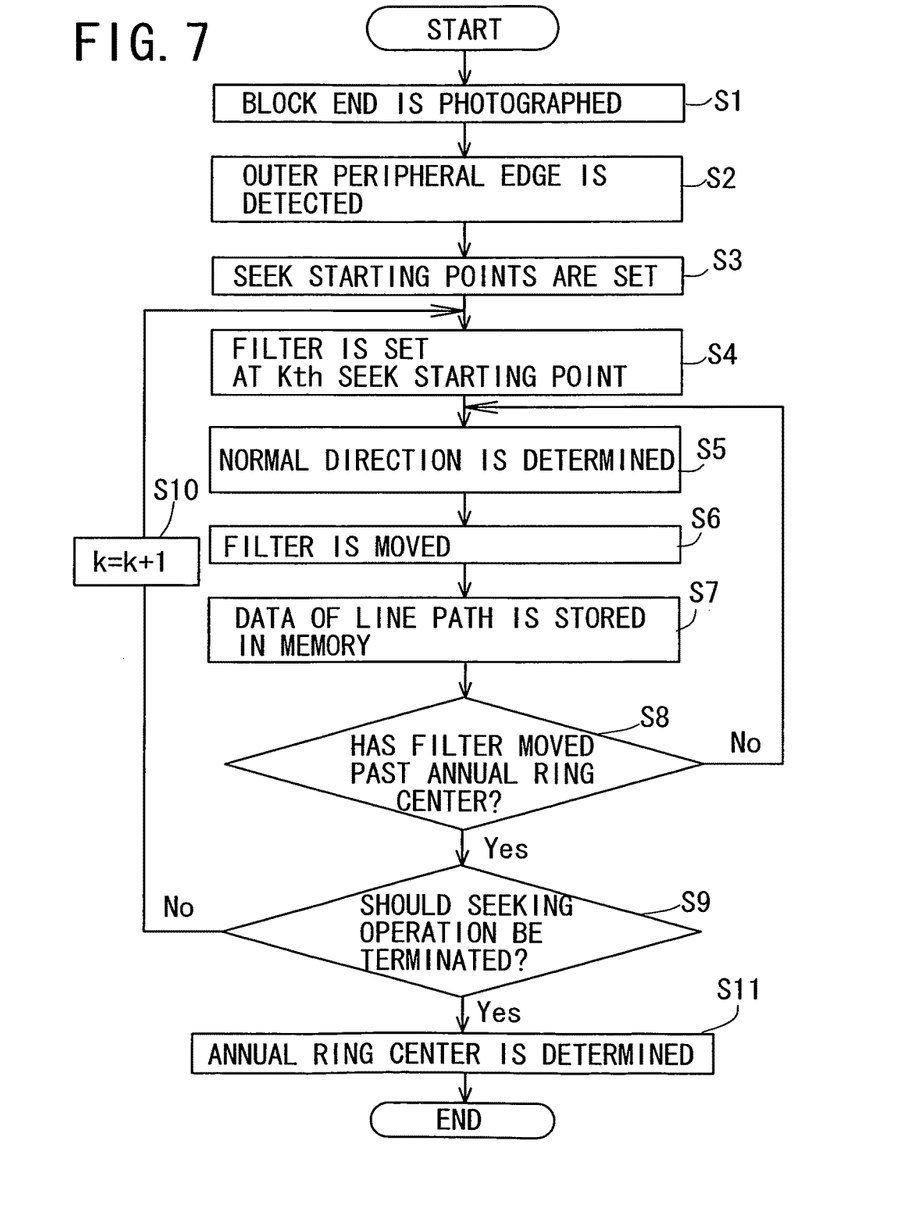
FIG. 7 is a flowchart explaining an example of operation of the apparatus of FIG. 1.

The following will describe a method of determining the annual ring center by using the apparatus of FIGS. 1 and 2, while having reference to a flowchart of FIG. 7 illustrating steps of procedure for determining the annual ring center according to the present embodiment.

Firstly, each of the opposite ends of a wood block 200 is photographed by the cameras 1A and 1B (Step 1). Photographed image of the wood block end is inputted to the computer 4 through the interface board 3 for processing of the image by the image processor 10 in the computer 4.

The peripheral edge detector 11 of the image processor 10 detects the outer peripheral edge of the wood block end image (Step 2). Then, the seek starting point setter 12 sets sixteen seek starting points 41 on the detected outer peripheral edge (Step 3). Subsequently, the path line seeker 13 sets the filter 42 at the "k"th (k=1 through 16) seek starting point 41 of the sixteen starting points 41 (Step 4).

After setting the filter 42 at the "k"th seek starting point 41 on the outer peripheral edge of the wood block end image, the path line seeker 13 determines the direction that is normal to an annual ring in the filter 42 in the manner as described in earlier part hereof (Step 5) and generates a normal line extending along the determined direction. Then, the path line seeker 13 moves the filter 42 for a distance corresponding a predetermined number of pixels along the generated normal line (Step 6). Then, the path line seeker 13 stores in memory the data of the resulting line of path 43 of the center C of the filter 42 in terms of coordinates (Step 7).

After the step 7, the path line seeker 13 determines whether or not the center C of the filter 42 has moved past the annual ring center 45 (Step 8). More specifically, the path line seeker 13 determines whether or not the distance moved by the filter 42 from the "k"th seek starting point 41 has exceeded a predetermined distance, e.g. a distance corresponding to 1.5 times as long as the radius of the wood block end image. For this purpose, the radius of wood block end image is previously measured and stored in memory in the computer 4.

If No, i.e. if it is determined that the center C of the filter 42 has not yet moved past the annual ring center 45, the operation is returned to Step 5. If Yes, i.e. if it is determined that the center C has already moved past the center 45, the path line seeker 13 determines whether or not the seeking operation should be terminated (Step 9). To be more specific, the seeker 13 determines whether or not the seeking steps 4 through 8 have been completed for all lines of path 43 from the sixteen seek starting points 41. If No, i.e. if it is determined that the seeking of all lines of path 43 has not yet been completed, the seeking operation is repeated from Step 4 for the (k+1)th seek starting point 41.

If Yes in Step 9, i.e. if it is determined that operation of seeking of all lines of path 43 has been completed, the aforementioned annular ring center specifier 14 determines the annual ring center 45 based on any points of intersection of the lines of path 43 (Step 11) in the manner as described above. Thus, the steps of operation of the flowchart ends.

As is apparent to those skilled in the art, the above-described steps of procedure are performed for each of the opposite ends of the wood block 200 so that the annual ring center is determined on each end of the wood block 200.

As described in detail above, according to the embodiments of the invention, the filter 42 is set in the wood block end image and the direction that is normal with respect to the annual ring in the filter is determined and a normal line extending along the determined normal direction is generated. Lines of path 43 each of which is composed of a plurality of normal lines and along which the filter 42 has moved from the respective seek starting points 41 are determined and generated. The annual ring center 45 is determined based on the point of intersections of such plural lines of paths 43.

According to such method, the annual ring center is determined automatically by processing and analyzing a photographed image of an end of a wood block. Therefore, the veneer lathe operator can be freed from the trouble of visually locating the annual ring center of a wood block each time the block is set on a rotary veneer lathe and the working efficiency in chucking a wood block by the lathe spindles at the annual ring center of the block is improved greatly.

In the above-described embodiments, normal lines are determined based on data such as the sum Σσ(i) of variances σ(i) and the variances σΣ(i) of sums Σ(i). However, present invention is not limited to such method of determining the normal lines. For example, a line that is tangential to an annual ring as viewed locally within a filter of any desired size is figured out and then a line that is normal to the tangential line may be determined. In this case, the filter may be of a frame specifying the area covering an annual ring on the wood block end image.

In the above-described embodiments, lines of path 43 of the filter 42 are sought for all sixteen different seek starting points 41 and the annual ring center 45 is calculated based on the point of intersection of such the lines of path 43. However, the present invention does not limit the number of the starting point 41 and hence the number of lines of path 43 to be sought to sixteen as in the case of the illustrated embodiments. For example, the seek starting points 41 may be set at three different points on the outer peripheral edge of the photographed wood block end image (or k=1 to 3) so that three lines of path such as 43 may be sought for determining the annual ring center 45. If three lines of path 43 intersect at a single point, that point of intersection is regarded as the annual ring center 45 and no more path seeking operation needs to be performed. By reducing the number of seek starting points 41, the processing load on the image processor 10 in seeking the lines of path may be reduced. If the three lines of path 43 fail to intersect at a single point, additional lines of path are sought so that a point of intersection that may be regarded as the annual ring center is found out.

In the above-described embodiments, the filter 42 has a plurality of parallel straight lines R(i). According to the present invention, however, the filter 42 may be formed by a single straight line R. When the single straight line R is set at such an angle where the straight line R is closest to being parallel to an annual ring in the block end image, the values of pixels lying on the straight line R are approximate to each other with only a little variance a of pixel values no matter where the straight line R is located in the varying grayscale image. The variance a of values of pixels lying on the straight line R is increased by rotating the straight line R from the position closest to being parallel to the annual rings. In other words, the more the straight line R is rotated away from the position that is closest to being parallel to the annual ring, the greater the variance a of pixel values is. Thus, the path line seeker 13 can recognize the line that is normal to the single straight line R at an angular position thereof where the variance a of pixel values is the least as the normal line with respect to the annual ring.

According to the present invention, the seek starting points such as 41 need not necessarily be located on the outer peripheral edge of the wood block end image determined by the peripheral edge detector 11. For example, the seek starting points may be set on an imaginary circle that is centered on the center of gravity such as G of a wood block end image and has a diameter smaller than the general diameter of the block end image. Since the annual rings are formed by annular rings whose general diameters are increased progressively radially outwardly from the annual ring center, the seeking of lines of path need not necessarily be started from the outermost peripheral edge of the wood block end image, but it may be started from any selected intermediate position between the outermost peripheral edge and the annual ring center. By so doing, the processing load on the image processor 10 during the path line seeking operation may be reduced.

In the above-described embodiments, the illumination devices 2A, 2B are located adjacently to the opposite ends 200A, 200B of a block 200 for illuminating the ends 200A, 200B with brightness that is enough for the cameras 1A, 1B to take clear images of the block ends 200A, 200B and also the background image. According to the present invention, a highly directional illumination light may be used for illumination of the wood block end with brightness just enough for photographing the wood block ends. Depending on the shape of a wood block end, it may be difficult for such directional illumination device to illuminate the whole block end. Therefore, the illumination device may be arranged so as to illuminate a limited area around a point that may be considered as the center of gravity of the wood block. In this case, the peripheral edge detector 11 detects the outer peripheral edge of a wood block end image that corresponds to the limited area of the wood block end illuminated by the directional light.

Although the invention has been described in detail for the purpose of illustration, it is to be understood that such detail is solely for that purpose and that variations can be made therein by those skilled in the art without departing from the spirit and scope of the invention.

What is claimed is:

1. An apparatus comprising:
a device for photographing an end of a wood block and generating an image composed of pixels and representing the wood block end with annual rings thereof;
a device for setting a plurality of seek starting points in the image of the wood block end;
a filter having a center and a plurality of parallel straight lines spaced at a distance that is smaller than a spaced distance between any two adjacent annual rings in the wood block end image and rotatable about the center thereof to a plurality of different angular positions thereof;
a device for setting the filter in the image of the wood block end, calculating a value representing a degree of spread-out of distribution of differences of pixel values of at least selected pixels lying on each of the straight lines of the filter from mean of said pixel values at each of said plurality of angular positions of the filter, calculating a sum of said values each representing the degree of spread-out of distribution for said plurality of straight lines of the filter at each of the angular positions of the filter, comparing the calculated sums and determining a line that is normal to the straight lines of the filter at an angular position thereof where the sum is the least as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and
a device for specifying the center of annual rings in the wood block end image based on points of intersections of said lines of path of the filter.

2. An apparatus comprising:
a device for photographing an end of a wood block and generating an image composed of pixels and representing the wood block end with annual rings thereof;
a device for setting a plurality of seek starting points in the image of the wood block end;
a filter having a center and a plurality of parallel straight lines spaced at a distance that is smaller than a spaced distance between any two adjacent annual rings in the wood block end image and rotatable about the center thereof to a plurality of different angular positions thereof;
a device for setting the filter in the image of the wood block end, calculating a value representing a degree of spread-out of distribution of differences of pixel values of at least selected pixels lying on each of the straight lines of the filter from mean of said pixel values at each of said plurality of angular positions of the filter, calculating a mean of said values each representing the degree of spread-out of distribution for said plurality of straight lines of the filter at each of the angular positions of the filter, comparing the calculated means and determining a line that is normal to the straight lines of the filter at an angular position thereof where the calculated mean is the least as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and
a device for specifying the center of annual rings in the wood block end image based on points of intersections of said lines of path of the filter.

3. An apparatus according to claim 1, wherein said value representing the degree of spread-out of distribution includes a variance of said pixel values.

4. An apparatus comprising:
a device for photographing an end of a wood block and generating an image composed of pixels and representing the wood block end with annual rings thereof;
a device for setting a plurality of seek starting points in the image of the wood block end;
a filter having a center and a plurality of parallel straight lines spaced at a distance that is smaller than a spaced distance between any two adjacent annual rings in the wood block end image and rotatable about the center thereof to a plurality of different angular positions thereof;

a device for setting the filter in the image of the wood block end, calculating a difference between maximum and minimum of pixel values of at least selected pixels lying on each of the straight lines of the filter at each of said plurality of angular positions of the filter, calculating a sum of the differences for said plurality of straight lines of the filter at each of the angular positions of the filter, comparing the calculated sums and determining a line that is normal to the straight lines of the filter at an angular position thereof where the sum is the least as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and a device for specifying the center of annual rings in the wood block end image based on points of intersections of said lines of path of the filter.

5. An apparatus comprising:

a device for photographing an end of a wood block and generating an image composed of pixels and representing the wood block end with annual rings thereof;

a device for setting a plurality of seek starting points in the image of the wood block end;

a filter having a center and a plurality of parallel straight lines spaced at a distance that is smaller than a spaced distance between any two adjacent annual rings in the wood block end image and rotatable about the center thereof to a plurality of different angular positions thereof;

a device for setting the filter in the image of the wood block end, calculating a sum of pixel values of at least selected pixels lying on each of said plurality of straight lines of the filter at each of said plurality of angular positions of the filter, calculating a value representing a degree of spread-out of distribution of differences of the sums of the pixel values from mean of said sums at each of said plurality of angular positions of the filter, comparing the calculated values each representing the degree of spread-out of distribution and determining a line that is normal to the straight lines of the filter at an angular position thereof where the value representing the degree of spread-out of distribution is the greatest as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and a device for specifying the center of annual rings in the wood block end image based on points of intersections of said lines of path of the filter.

6. An apparatus according to claim 5, wherein said value representing the degree of spread-out of distribution includes a variance of said sums of the pixel values.

7. An apparatus according to claim 5, wherein said value representing the degree of spread-out of distribution includes a difference between maximum and minimum of said sums of the pixel values.

8. An apparatus comprising:

a device for photographing an end of a wood block and generating an image composed of pixels and representing the wood block end with annual rings thereof;

a device for setting a plurality of seek starting points in the image of the wood block end;

a filter having a center and a plurality of parallel straight lines spaced at a distance that is smaller than a spaced distance between any two adjacent annual rings in the wood block end image and rotatable about the center thereof to a plurality of different angular positions thereof;

a device for setting the filter in the image of the wood block end, calculating a mean of pixel values of at least selected pixels lying on each of said plurality of straight lines of the filter at each of said plurality of angular positions of the filter, calculating a value representing a degree of spread-out of distribution of differences of the means of the pixel values from mean of said means of the pixel values at each of said plurality of angular positions of the filter, comparing the calculated values each representing the degree of spread-out of distribution and determining a line that is normal to the straight lines of the filter at an angular position thereof where the value representing the degree of spread-out of distribution is the greatest as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and a device for specifying the center of annual rings in the wood block end image based on points of intersections of said lines of path of the filter.

9. An apparatus according to claim 8, wherein said value representing the degree of spread-out of distribution includes a variance of said means of the pixel values.

10. An apparatus according to claim 8, wherein said value representing the degree of spread-out of distribution includes a difference between maximum and minimum of said means of the pixel values.

11. An apparatus comprising:

a device for photographing an end of a wood block and generating an image composed of pixels and representing the wood block end with annual rings thereof;

a device for setting a plurality of seek starting points in the image of the wood block end;

a filter having a center and one straight line of a predetermined length and rotatable about the center to a plurality of different angular positions thereof;

a device for setting the filter in the image of the wood block end, calculating a degree of spread-out of distribution of differences of pixel values of at least selected pixels lying on the straight line from mean of said pixel values at each of said plurality of angular positions of the filter, determining a line that is normal to said one straight line of the filter at an angular position thereof where said degree of spread-out of distribution is the least as the normal line with respect to a line that is tangential to the annual ring, thereby generating such normal line, moving the filter for a predetermined distance along the generated normal line radially inwardly of the wood block end image, repeating said generating a normal line and said moving the filter for each of the seek starting points, thereby seeking and generating a plurality of lines of path of the filter starting from the respective seek starting points, and a device for specifying the center of annual rings in the wood block end image based on points of intersections of said lines of path of the filter.

12. An apparatus according to claim 1, wherein said specifying device is operable to determine a point of intersection of said lines of path of the filter starting from said plurality of seek starting points as the center of annual rings of the wood block end image.

13. An apparatus according to any one of claims 12, wherein, when said lines of path of the filter starting from said plurality of seek starting points fail to intersect at a single point, said specifying device is operable to determine gravity center of any plural points of intersection of the lines of path of the filter as the center of annual rings of the wood block end image.

14. A method comprising the steps of:

photographing an end of a wood block and generating an image composed of pixels and representing the wood block end with annual rings thereof;

setting a plurality of seek starting points in the image of the wood block end;

setting a filter of a predetermined size in the image of the wood block end;

rotating the filter about the center thereof to a plurality of angular positions thereof;

determining and generating a normal line with respect to a line that is tangential to an annual ring present in the filter at each of said angular positions of the filter;

moving the filter for a predetermined distance along the generated normal line radially inwardly of the wood block end image;

repeating said generating a normal line and moving the filter for each of said plurality of seek starting points, thereby seeking and generating lines of path of the filter starting from the respective seek starting points; and specifying the center of annual rings in the wood block end image based on points of intersections of the lines of path of the filter.

15. An apparatus according to claim 2, wherein said value representing the degree of spread-out of distribution includes a variance of said pixel values.

16. An apparatus according to claim 2, wherein said specifying device is operable to determine a point of intersection of said lines of path of the filter starting from said plurality of seek starting points as the center of annual rings of the wood block end image.

17. An apparatus according to claim 4, wherein said specifying device is operable to determine a point of intersection of said lines of path of the filter starting from said plurality of seek starting points as the center of annual rings of the wood block end image.

18. An apparatus according to claim 5, wherein said specifying device is operable to determine a point of intersection of said lines of path of the filter starting from said plurality of seek starting points as the center of annual rings of the wood block end image.

19. An apparatus according to claim 8, wherein said specifying device is operable to determine a point of intersection of said lines of path of the filter starting from said plurality of seek starting points as the center of annual rings of the wood block end image.

20. An apparatus according to claim 11, wherein said specifying device is operable to determine a point of intersection of said lines of path of the filter starting from said plurality of seek starting points as the center of annual rings of the wood block end image.

* * * * *